(12) United States Patent
Nishikawa et al.

(10) Patent No.: US 7,288,741 B2
(45) Date of Patent: Oct. 30, 2007

(54) ARC WELDER

(75) Inventors: Seigo Nishikawa, Fukuoka (JP);
Seiichiro Fukushima, Fukuoka (JP);
Tsuneo Shinada, Kanagawa (JP);
Kiyoshi Naito, Kanagawa (JP)

(73) Assignees: Hitachi Via Mechanics, LT, Kanagawa (JP); Kabushiki Kaisha Yasakawa Denki, Fukuoka (JP)

( * ) Notice: Subject to any disclaimer, the term of this patent is extended or adjusted under 35 U.S.C. 154(b) by 38 days.

(21) Appl. No.: 10/781,911

(22) Filed: Feb. 20, 2004

(65) Prior Publication Data

US 2004/0206736 A1 Oct. 21, 2004

(30) Foreign Application Priority Data

Feb. 20, 2003 (JP) .................. P.2003-043024

(51) Int. Cl.
*B23K 9/10* (2006.01)
(52) U.S. Cl. .................. 219/130.1; 219/130.51

(58) Field of Classification Search ............. 219/130.1, 219/130.21, 130.31, 130.32, 130.33
See application file for complete search history.

(56) References Cited

U.S. PATENT DOCUMENTS 5,148,001 A * 9/1992 Stava .................... 219/137 PS
5,645,741 A * 7/1997 Terayama et al. ......... 219/130.4

FOREIGN PATENT DOCUMENTS

JP 5-318128 A 12/1993

* cited by examiner

*Primary Examiner*—Clifford C. Shaw
(74) *Attorney, Agent, or Firm*—Sughrue Mion Pllc.

(57) ABSTRACT

An arc welder comprising: a rectifier circuit 2 which rectifies an alternating current 1 to a direct current; an inverter circuit 3; a transformer 4; a second rectifier circuit 5 which rectifies an output of the transformer 4 to a direct current; and a first reactor 6 which is connected to the second rectifier circuit 5. The arc welder further has a current circuit 10 which is connected in parallel to the second rectifier circuit 5 with a reactance that is larger than the reactance of the first reactor 6.

2 Claims, 3 Drawing Sheets

ARC WELDER

BACKGROUND OF THE INVENTION

1. Field of the Invention

The present invention relates to an improvement of an arc welder of the type in which an alternating current is rectified to a direct current, the direct current output is converted to a high-frequency alternating current by an inverter circuit based on the PWM control, the voltage of the high-frequency alternating current is converted by a transformer to an adequate voltage, and the alternating current is then rectified to a direct current by a rectifier circuit.

2. Description of the Related Art

A conventional MAG welding power source grouping as the constant voltage type will be described below with reference to FIG. 4. In FIG. 4, the numerical reference 40 denotes a DC reactor of a current superposing circuit, 41 denotes a DC reactor of an output main circuit, 42 denotes a wire, 43 denotes a pair of wire feed rollers, 44 denotes a conductivity tip, and 45 denotes an arc load. The output main circuit is formed so as to elongate from terminals of a secondary winding 56 to the midpoint thereof through a rectifier 6, the DC reactor 41, the conductivity tip 44, the wire 42, the arc load 45, and workpieces. The current superposing circuit is formed such as to elongate from terminals of the secondary winding 56 to the midpoint of the secondary winding 56 through capacitors 51, full-wave rectifying diodes 52, a DC reactor 40, the DC reactor 41, the conductivity tip 44, the wire 42, and the arc load 45. The capacitances of the capacitors 51 might be selected so that the current flowing can be made sufficient for maintaining an arc although the current flowing through the current superposing circuit is smaller than that of a usual welding current. Hereinafter, the operation will be described. When the wire extension of the tip is excessively blown away at the starting period of an arc, which ends up raising the arc voltage, for instance, the welding current becomes insufficient. However, as the result of a current supplied from the current superposing circuit, the arc is not interrupted. Although exemplarily described in the above is a MAG welding power source of the constant voltage type, the above configuration may be also applied to a pulsed arc welding power source. In this case, the current to be supplied from the superposing circuit maybe set to be slightly smaller than the base current. Having this configuration, it is possible to prevent the arc from being interrupted, even when the feed resistance of a wire, being subjected to a welding process, is changed so that the arc length is so increased and arc interruption occurs under the base current such as disclosed in line 20 of right column of page 3 to line 8 of left column of page 4, or FIG. 4 of JP-A-5-318128.

In a conventional arc welder, however, it can not be easily done with a single arc welder to conduct both short circuiting arc welding and pulsed arc welding there-into. This is because the welding current in short circuiting arc welding is required for being moderately changed, whereas the pulsed arc welding requires steep change. The DC reactor denoted by 41 in FIG. 4 controls the welding current change. In short circuiting arc welding, in general, a DC reactor of 30 to 200 μH (microhenries) is used, while in pulsed arc welding a DC reactor of 5 to 20 μH is used.

In case of both the short circuiting arc welding and pulsed arc welding being performed by a single welder, so-called an electronic reactor control method is used. This method uses a DC reactor of a small reactance for pulsed arc welding, however, the shortage in the reactance can be compensated by controlling a controlling circuit 17 of FIG. 4 so as to produce a current change resembling to an enhancement of the DC reactor. In other words, since reactance is difficult for being reduced, but it can be increased, the reactor in the hardware is structured so as to have a small reactance suitable for pulsed arc welding, while short circuiting arc welding can be performed with using a combination of the small reactance and the electronic reactor.

In MAG short circuiting arc welding using a large current or short circuiting arc welding under $CO_2$ arc welding, however, a stable welding state is difficult by relying only on the combination control of the small reactance and the electronic reactor by said electronic reactor control method. In a related art, two types of welders, an arc welder for short circuiting arc welding having a large reactance, and another one for the pulsed arc welding having a small reactance shall be set at the same time. Therefore, its user must prepare the two types of welders, which causes the problems of increasing the apparatus cost, increasing the numbers of the spare parts, or requiring the time for exchanging two welders, depending on the welding method being used.

In the circuit of another related art, since the capacitors 51 are connected in series to the diodes 52, peak amount charge can be immediately performed. Therefore, given that the output voltage of the transformer is indicated by Vi, that of the superposing circuit by Vo, the current of the superposing circuit by Io, and the capacitance of each of the capacitors by C, the energy Vo∘Io output from the current superposing circuit is proportional to the charging/discharging energy C∘Vi∘Vi of the capacitor, or proportional to the square of the output voltage Vi of the transformer. In the PWM control, the energy is changed by controlling the ON time while the voltage Vi is maintained constant, and the value of C∘Vi∘Vi in the conventional art is therefore approximately constant. In other words, in the case where the output voltage Vo is low, such as the case of a short circuit, the current Io is abnormally increased. On the other hand, when the output voltage Vo is constant, the output current Io is generally constant irrespective of the value of the main current. As the result, if a large current is to be supplied to the superposing circuit when the main current is large, then a large current would be eventually supplied to the superposing circuit even in case of the main current being small. In this regard, it is impossible to perform both short circuiting arc welding and pulsed arc welding by a single welder.

SUMMARY OF THE INVENTION

The invention has been made in view of the problems discussed above. It is an object of the invention to provide an apparatus in which both short circuiting arc welding and pulsed arc welding can be performed by a single welder.

In order to solve the problems, the invention is configured in the following manner.

(1) The arc welder is an arc welder comprising: a rectifier circuit which rectifies an alternating current to a direct current; an inverter circuit which converts an output of the rectifier circuit to a high-frequency alternating current; a transformer which converts an output of the inverter circuit to a voltage suitable for arc welding; a second rectifier circuit which rectifies an output of the transformer to a direct current; and a first reactor which is connected to the second rectifier circuit, wherein the arc welder comprises a current circuit which is connected in parallel to the second rectifier circuit with a reactance that is larger than a reactance of the first reactor.

(2) The arc welder is characterized in that the reactance of the first reactor is 20 µH (microhenries) or smaller, and the reactance of the current circuit which is connected in parallel to the second rectifier circuit is 100 µH or larger.

(3) The arc welder is characterized in that the current circuit which is connected in parallel to the second rectifier circuit comprises: a current controlling circuit which controls a current; a third rectifier circuit which rectifies the controlled current; and a second DC reactor which is connected to the third rectifier circuit.

DESCRIPTION OF THE PREFERRED EMBODIMENTS

Hereinafter, specific embodiments of the invention will be described with reference to the accompanying drawings.

First Embodiment

Figure 1:
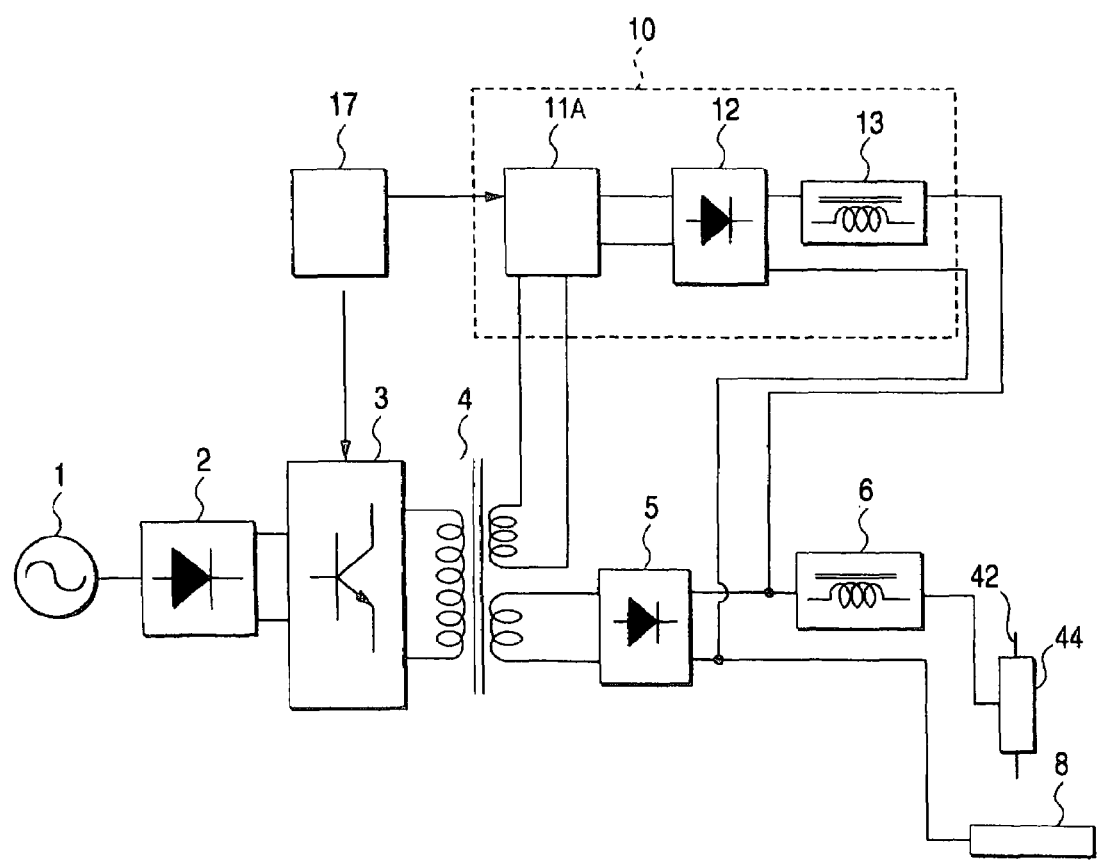
FIG. 1 is a diagram of a first embodiment of the invention.

FIG. 1 is a diagram of the arc welder of the invention.

Figure 4:
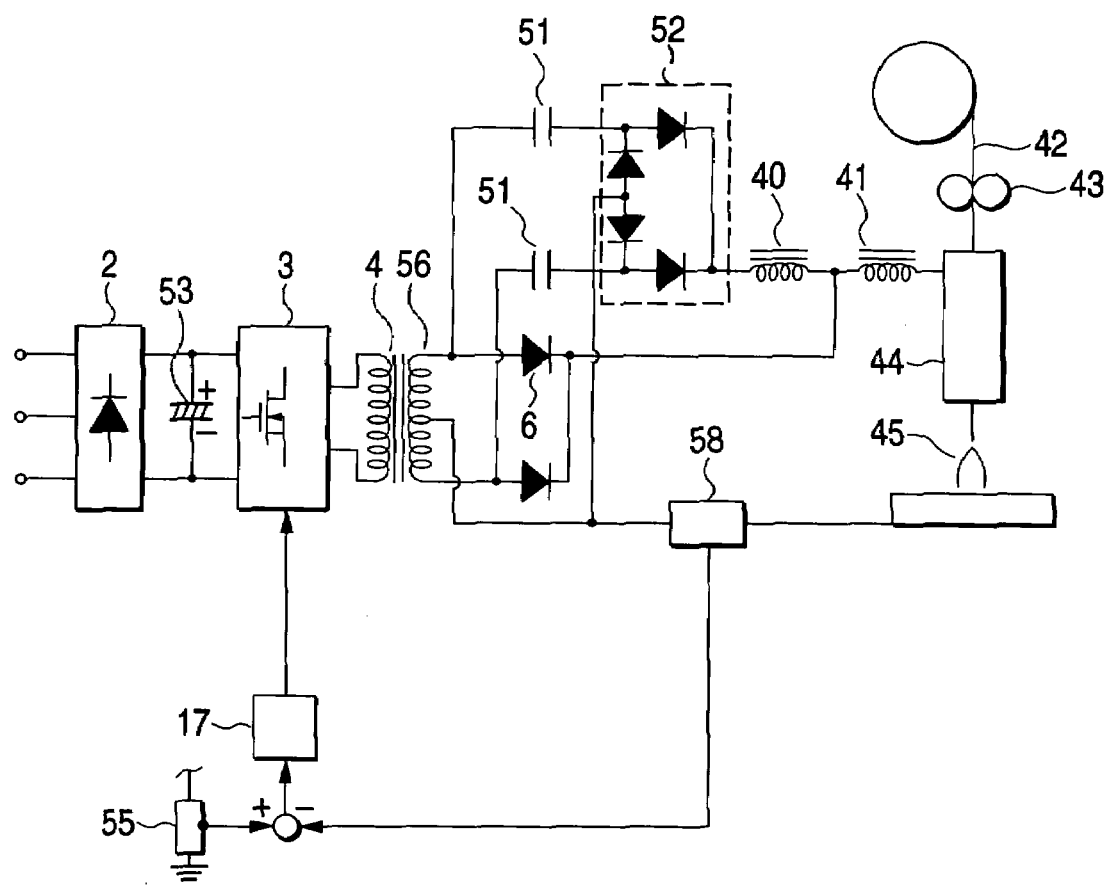
FIG. 4 is a diagram of the conventional art.

A current of a commercial alternating current power source 1 is converted to a direct current by a first rectifier circuit 2. An output of the first rectifier circuit 2 is converted to a high-frequency current of 20 to 200 KHz by an inverter circuit 3. An output of the inverter circuit 3 is converted by an isolating transformer 4 to a voltage suitable for welding, and then converted to a direct current by a second rectifier circuit 5. The direct current is passed through a DC reactor 6, and then supplied to a wire 42 to be used as an arc current in an arc-welding portion. The current route of the isolating transformer 4, the second rectifier circuit 5, and the DC reactor 6 is identical with that of the conventional welder of FIG. 4. A reactor of 20 µH or smaller suitable for pulsed arc welding is used as the DC reactor 6.

The welder of the invention has a current circuit 10 which is connected in parallel to the second rectifier circuit 5. In the parallel current circuit 10, a current generated by the voltage at the isolating transformer 4, which is suitable for welding, is passed through a current controlling circuit 11A to be converted to a direct current by a third rectifier circuit 12, and further said direct current is passed through a DC reactor 13 and the DC reactor 6 to be supplied to the arc welding portion. The current controlling circuit 11A is configured by semiconductor elements, and turns ON/OFF gates of the semiconductor elements in accordance with a signal from the controlling circuit 17 to control the current flowing therethrough. A reactor of 100 to 2,000 µH is used as the DC reactor 13.

In MAG short circuiting arc welding or $CO_2$ welding using a large current, unstable welding might be caused by arc interruption. In this embodiment, welding can be stabilized by supplying a current to the welding portion so as to suppress arc interruption.

Although the DC reactor 13 has a large reactance of 100 to 2,000 µH, the reactor does not impede the rise of a current in pulsed arc welding because the reactor is connected in parallel to the route of the isolating transformer 4, the second rectifier circuit 5, and the DC reactor 6. The DC reactor 13 effectively operates when arc interruption occurs during an arc time in short circuiting arc welding. Arc interruption might be recognized as a state where, when a molten pool vibrates or gas explosion in a molten pool occurs, the distance between the welding electrode and workpieces to be welded is suddenly increased and the welding current is reduced, whereby an arc cannot be maintained. In order to prevent arc interruption from occurring, the DC reactor 13 which supplies a current in response to reduction of the welding current is effective. Since the DC reactor 6 in the main circuit has a small reactance, the reactor does not substantially contribute to prevention of arc interruption. To the contrary, since the reactance of the DC reactor 13 which is connected in parallel is as large as 100 to 2,000 µH, the reactor sufficiently plays the role of preventing arc interruption from occurring.

With respect to the steep current rising change at the starting timing of an arc, the DC reactor 13 does not impede the current rising because of the reactor being connected in parallel to the main circuit.

The controlling circuit 17 controls the current controlling circuit 11A so that an adequate amount of current can flow from the isolating transformer 4 to the third rectifier circuit 12 and the DC reactor 13 through the current controlling circuit 11A.

The adequate amount of current to be supplied to the welding portion is recognized as a current amount which does not bring about adverse effect to the welding. Said current amount might be produced by the current that is flowing through the route of the isolating transformer 4, the rectifier circuit 5, and the DC reactor 6. From the fact that an arc interruption always occurs during the arc time, in case of short circuiting arc welding, the current flowing during the arc time is controlled so as to be larger in its current amount than that of flowing during the short circuit time. Namely, the current is controlled so that a larger amount of current is supplied to the current circuit 10 as the arc current during welding is larger. More specifically, the current control is performed so that a current which is 30% to 80% of the arc current is supplied to the current circuit 10.

The current controlling circuit 11A controls the alternating current. Alternatively, the current controlling circuit may be connected between the rectifier circuit 12 and the DC reactor 13 so as to control the direct current, whereby the same effects can be also expected.

Second Embodiment

Figure 2:
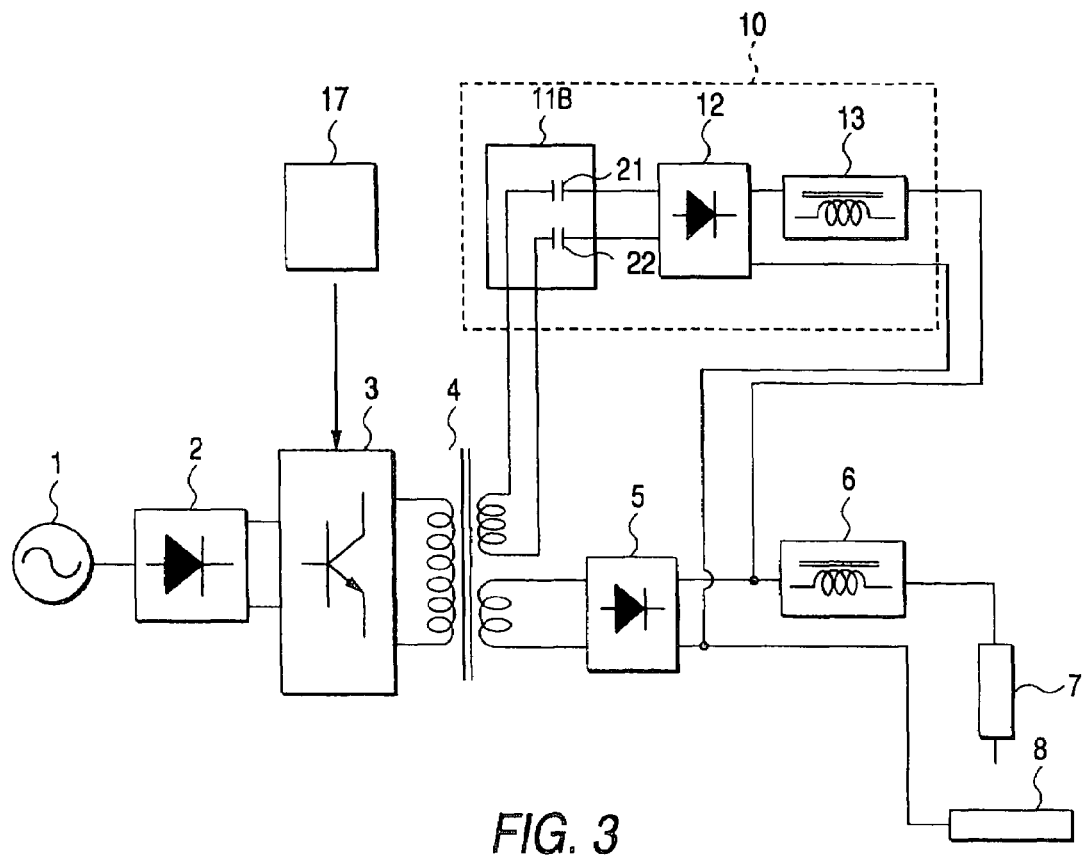
FIG. 2 is a diagram of a second embodiment of the invention.

FIG. 2 shows a second embodiment. The current controlling circuit 11B is configured by capacitors 21, 22. In the case of FIG. 2, the turn ratio of the isolating transformer 4 is set so as to transform the voltage in the following manner. Namely, the voltage applied to the current controlling circuit 11B is higher than that of being applied to the second rectifier circuit 5. Further, the capacitors 21, 22 are selected so as to have a capacitance at which charging is not completed even at 100%-ON operation of the inverter circuit 3.

Since the voltage that is obtained at the side of the isolating transformer 4, the current controlling circuit 11B, and the rectifier circuit 12 is higher than that of the route from the isolating transformer 4 to the second rectifier circuit 5, the current is likely to flow through the route from the isolating transformer 4 to the rectifier circuit 12 via the current controlling circuit 11B, however, said current is limited by the current controlling circuit 11B, which is configured by the capacitors 21 and 22.

In other words, when the voltage (average voltage) applied to the isolating transformer is high, the current is large, and, when the voltage applied to the isolating transformer is low, the current is small.

In the short circuiting arc welding operation, during the short circuit time, the voltage applied to an isolating transformer is low, and, during the arc time, the voltage applied to the isolating transformer is high. From the fact such that an arc interruption always occurs during the arc time, in this invention, applies high voltage to the isolating transformer 4 during the arc time so that a larger amount of current can be supplied to the rectifier circuit 12 and the DC reactor 13 from the isolating transformer 4 through the current controlling circuit 11B whereby arc interruption can be prevented from occurring.

Figure 3:
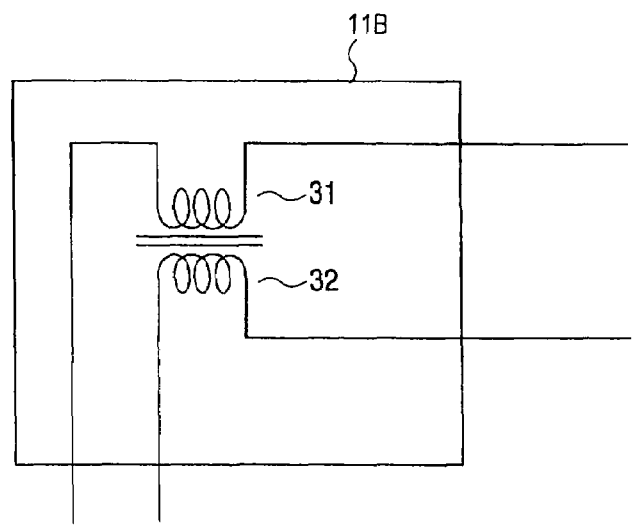
FIG. 3 is a diagram of a current controlling circuit.

In the current controlling circuit 11B, coils may be used in place of the capacitors. FIG. 3 shows the case where coils 31, 32 are used. Since a coil has a functionality of limiting an alternating current, it can be alternatively replaced with the capacitor.

As described above, in the arc welder of the invention, an arc interruption preventing circuit is connected in parallel to the main current circuit, whereby both short circuiting arc welding and pulsed arc welding can be performed by a single welder.

Although fluctuation of a commercial alternating current power source varies the peak value of an output voltage of an inverter circuit, significant effect to stabilize the welding can be expected by the arc welder of this invention with a configuration residual to the voltage variations on the primary side.

What is claimed is:

1. An arc welder having: a rectifier circuit which rectifies an alternating current to a direct current; an inverter circuit which converts an output of said rectifier circuit to a high-frequency alternating current; a transformer which converts an output of said inverter circuit to a voltage suitable for arc welding; a second rectifier circuit which rectifies an output of said transformer to a direct current; and a first DC reactor which is connected to said second rectifier circuit, wherein said arc welder comprises a current circuit which is connected in parallel to said second rectifier circuit with a reactance that is larger than a reactance of said first DC reactor, a voltage that is applied to the current circuit from the transformer is higher than a voltage that is applied to the second rectifier circuit from the transformer, an output voltage of the current circuit is higher than an output voltage of the second rectifier circuit, and said current circuit comprises:
a current controlling circuit which controls a current that is outputted from said transformer,
a third rectifier circuit which rectifies said controlled current, and
a second DC reactor which is connected to said third rectifier circuit.

2. The arc welder according to claim 1, wherein said reactance of said first DC reactor is 20 μH (microhenries) or smaller, and said reactance of said current circuit which is connected in parallel to said second rectifier circuit is 100 μH or larger.

* * * * *

UNITED STATES PATENT AND TRADEMARK OFFICE
CERTIFICATE OF CORRECTION

PATENT NO. : 7,288,741 B2
APPLICATION NO. : 10/781911
DATED : October 30, 2007
INVENTOR(S) : Seigo Nishikawa It is certified that error appears in the above-identified patent and that said Letters Patent is hereby corrected as shown below:

On title page should read as:
Item --(73) HITACHI VIA MECHANICS, LTD., Kanagawa (JP); KABUSHIKI KAISHA YASKAWA DENKI, Fukuoka (JP)--

Signed and Sealed this

Twelfth Day of August, 2008

JON W. DUDAS
*Director of the United States Patent and Trademark Office*